United States Patent [19]

Schmeling

[11] Patent Number: 4,999,898

[45] Date of Patent: Mar. 19, 1991

[54] RAIL ANCHOR TOOL

[76] Inventor: Glenn E. Schmeling, 2651 S. 15th St., Milwaukee, Wis. 53222

[21] Appl. No.: 548,812

[22] Filed: Jul. 6, 1990

[51] Int. Cl.[5] .............................................. B23P 19/04

[52] U.S. Cl. .................................. 29/243.56; 29/267

[58] Field of Search ..................... 29/243.56, 267, 229, 29/270, 278; 254/131.5, 131, 18, 25

[56] References Cited

U.S. PATENT DOCUMENTS 1,740,158 12/1929 Dinklage .............................. 29/267

1,809,386 6/1931 Mason .............................. 29/243.56

4,466,188 8/1984 Svendsgaard .................... 254/131.5

*Primary Examiner*—Robert C. Watson

*Attorney, Agent, or Firm*—James L. Kirschnik

[57] ABSTRACT

An improved tool for manually removing or installing rail anchors of the spring clip type, includes an anchor engaging portion adapted to grip the anchor during installation or removal from the rail base. A handle is provided which has an angular portion and a substantially horizontally extending portion attached to the anchor engaging portion and includes a contiguously formed downwardly extending step portion for permitting stepping forces to supplement forces generated by arm and hand motion.

7 Claims, 1 Drawing Sheet

RAIL ANCHOR TOOL

BACKGROUND OF THE INVENTION

1. Field Of The Invention

This invention relates to tools for installing or removing rail anchors used on train tracks. Rail anchors are typically snapped into place on the base of a rail on opposite sides of a railroad tie to limit transverse movement of the rail relative to the railroad tie.

2. Description Of The Prior Art

Rail anchors have long been used in the railroad industry. The anchors typically comprise heavy spring like clips of varying shapes adapted to be elastically deformed to lock beneath a rail base adjacent to a railroad tie. While machines have been made for installing rail anchors as described in U.S. Pat. No. 4,367,682 to Freilich, et al, issued Jan. 11, 1983, manually operated tools are also used for smaller repair jobs where the use of specialized machinery may not be economically feasible. One hand tool for installing a variation of rail anchor is shown and described in U.S. Pat. No. 1,691,940 to Scholes issued Nov. 20, 1928. Scholes uses a fulcrum applied against the top of a rail for pulling an anchor into place at the bottom of the rail. Another and more pertinent tool to the present invention is shown in U.S. Pat. No. 1,740,158 to Dinklage issued Dec. 17, 1929. The tool described in Dinklage is adapted to either install or remove rail anchors of a particular configuration, however, the Dinklage tool and similar tools which applicant is familiar with for manual installation or removal of rail anchors use an elongated handle extending from a grip portion of the tool which acts upon the rail anchor for installation or removal. A major disadvantage of such tools is that they require extensive forces exerted upon the handle by the installer's hands and arms. Slippage of the tool from the anchor can result in injuries to hands and fingers and often result in back injuries.

SUMMARY OF THE INVENTION

It is an object of the invention to provide an improved tool for installing or removing rail anchors with decreased risk of injuries and more efficient force generating capability.

The present invention provides a tool adapted to grip a rail anchor during installation or removal and having a handle for manually rotating the grip portion during installation or removal of the rail anchors. The handle includes a downwardly extending step which permits the operator to supplement forces generated by his arms and shoulders with the power of his leg muscles.

DESCRIPTION OF A PREFERRED EMBODIMENT

Figure 1:
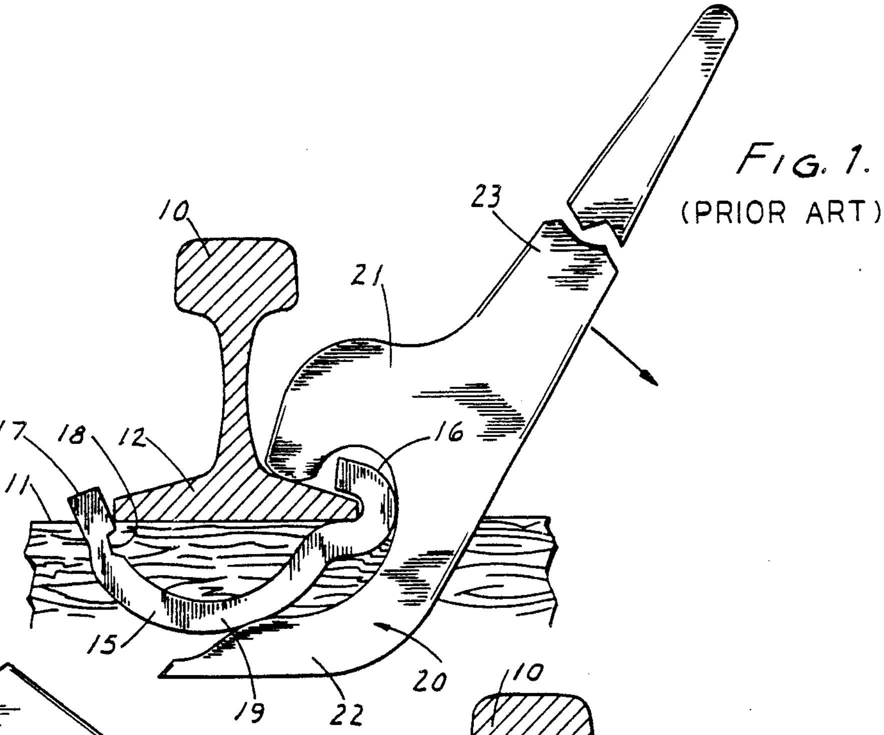
FIG. 1. (PRIOR ART)
FIG. 1 is a side elevation view of the conventional rail anchor tool positioned to install a rail anchor.

Referring to FIG. 1 a conventional rail 10 is shown in cross-section supported on a railroad tie 11 with rail flanges 12 extending from either side at the base of the rail 10 resting on the top surface of tie 11. A typical rail anchor 15 as described in U.S. Pat. No. 1,740,158 to Dinklage issued Dec. 17, 1929 is shown in position to be installed. As described in Dinklage in more detail, the anchor includes a hook end 16 which engages the rail flange 12 on one side and has a latch member 17 with a notch 18 formed therein for engaging the opposite side of the flange 12. An arcuate yoke portion 19 extends beneath the base of rail 10. The tool according to Dinklage includes an anchor engaging or grip end 20 including an upper fork tine 21 and a lower fork tine 22 and has an extended handle 23 for providing manual leverage to rotate the grip end 20. The lower tine 22 is configured to exert an upward force against yoke 19 to snap the latch member 17 upward and engage notch 18 on the opposite end of the rail flange 12.

Figure 2:
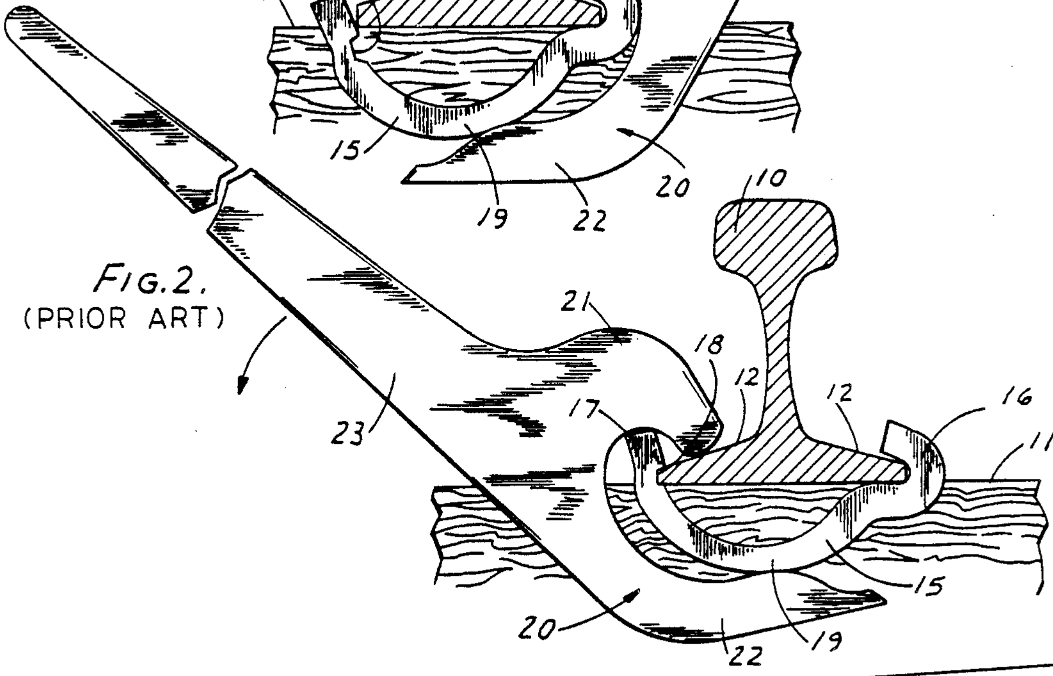
FIG. 2. (PRIOR ART)
FIG. 2 is an elevation view of a tool according to FIG. 1 positioned to remove a rail anchor; and, FIG. 3 is a side elevation of an improved rail anchor tool according to the invention.

FIG. 2 shows the same anchor tool as described in Dinklage positioned to remove the anchor 15 by action of the upper fork tine 21 pulling the latch member 17 away from the rail flange 12 while the lower tine 22 acts against the yoke 19 to assist in the elastic deformation of the anchor 15 for disengagement of notch 18 and removal of the anchor 15.

Figure 3:
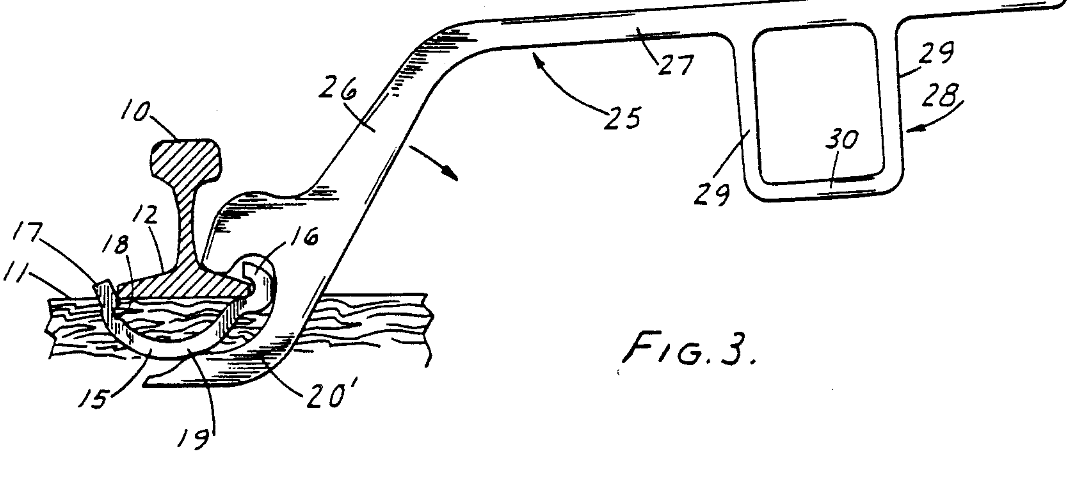

An improved tool 25 according to the invention is shown in FIG. 3. An anchor grip portion 20′ is shown which is configured similar to the grip portion described and shown in FIGS. 1 and 2 and as described in the Dinklage patent. A handle 26 extends upwardly at an angle away from the grip portion 20′ and is bent to form a substantially horizontally extending portion 27. A step assembly 28 is attached to the generally horizontal portion 27 of the handle and includes two spaced downwardly extending legs 29 and a horizontal step portion 30 connecting them below the horizontal handle portion 27. The operator may grasp the generally horizontally extending handle 27 with his hands and place one of his feet within the step assembly 28. Thus he may exert both a downwardly extending force on the handle 27 to rotate the anchor grip portion 20′ with a combination of hand and arm strength as well as forces from his leg muscles. The same principles apply to either the removal or the installation of the rail anchor 15 with the leverage for imparting the necessary forces to the rail anchors being greatly enhanced.

The preferred materials for the tool are high strength steels because of the forces generated during removal or installation of the rail anchors. Approximately 1″ diameter steel bar stock is suitable for the handles and step portions which may be attached by welding or other suitable fastening methods. The preferred embodiment which I constructed has the angular handle portion 26 extending approximately 50 degrees upwardly away from the anchor engaging portion 20′ for a distance of approximately 2 feet with the horizontal handle portion extending approximately 3 feet and the step portion 30 located approximately 18 inches below the handle 27. It will be apparent to those skilled in the art, however, that the actual angles and dimensions may vary without departing from the scope and intent of the invention. Since many different rail anchor styles and designed exist, the shape of the grip portion 20′ may vary depending upon the particular style and type of anchor, and some tools may be suitable for installation of anchors but not removal and vice versa.

Accordingly, the scope of the invention is to be taken solely from an interpretation of the claims which follow.

I claim:

1. A tool for manually installing or removing rail anchors onto or from the base of a railroad track comprising:

a. grip means for gripping a rail anchor to snap it in place on a rail or for removing the same;

b. handle means extending from said grip means for being manually grasped by a human operator to rotate said grip means and anchor in a substantially vertical plane during installation or removal;

c. step means attached to and extending below said handle means for permitting said operator to apply a downward force to said handle by stepping down on said step means;

d. said handle means including a first portion extending angularly upward approximately two feet from said grip means when positioned to install or remove an anchor and a second portion contiguous to said first portion and extending in a generally horizontal direction for approximately three feet; and e. said step means being attached to the horizontally extending second portion of said handle means.

2. A tool as set forth in claim 1, wherein said step means comprises spaced support members extending generally downwardly from said handle means and including a generally horizontal step portion attached to the lower ends of said support members.

3. A tool as set forth in claim 1, wherein said step means comprises spaced support members extending generally downwardly from said handle means and including a generally horizontal step portion attached to the lower ends of said support members.

4. A tool for manually removing rail anchors from the base of a railroad track comprising:

a. grip means for gripping a rail anchor for removing said anchor from a rail;

b. handle means extending from a said grip means for being manually grasped by a human operator to rotate said grip means and anchor in a substantially vertical plane during removal;

c. step means attached to and extending below said handle means for permitting said operator to apply a downward force to said handle by stepping down on said step means;

d. said handle means including a first portion extending angularly upward approximately two feet from said grip means when positioned to install or remove an anchor and a second portion contiguous to said first portion and extending in a generally horizontal direction for approximately three feet; and, e. said step means being attached to the horizontally extending second portion of said handle means.

5. A tool as set forth in claim 4, wherein said step means comprises spaced support members extending generally downwardly from said handle means and including a generally horizontal step portion attached to the lower ends of said support members.

6. A tool for manually installing rail anchors on the base of a railroad track comprising:

a. grip means for gripping a rail anchor to snap it in place on a rail;

b. handle means extending from said grip means for being manually grasped by a human operator to rotate said grip means and anchor in a substantially vertical plane during installation;

c. step means attached to and extending below said handle means permitting said operator to apply a downward force to said handle by stepping down on said step means;

d. said handle means including a first portion extending angularly upward approximately two feet from said grip means when positioned to install or remove an anchor and a second portion contiguous to said first portion and extending in a generally horizontal direction for approximately three feet; and, e. said step means being attached to the horizontally extending second portion of said handle means.

7. A tool as set forth in claim 6, wherein said step means comprises spaced support members extending generally downwardly from said handle means and including a generally horizontal step portion attached to the lower ends of said support members.

* * * * *